United States Patent
Perez et al.

(10) Patent No.: US 6,363,974 B1
(45) Date of Patent: Apr. 2, 2002

(54) FLEXIBLE PIPE AND METHOD OF MANUFACTURING SAME

(75) Inventors: Ramon A. Perez, Houston, TX (US); Dana J. Fraser; Mark D. Kalman, both of Panama City, FL (US)

(73) Assignee: Wellstream, Inc., Panama City, FL (US)

(*) Notice: Subject to any disclaimer, the term of this patent is extended or adjusted under 35 U.S.C. 154(b) by 0 days.

(21) Appl. No.: 09/705,308

(22) Filed: Nov. 3, 2000

Related U.S. Application Data

(60) Provisional application No. 60/163,908, filed on Nov. 5, 1999.

(51) Int. Cl.[7] .................................................. F16L 11/10
(52) U.S. Cl. ........................ 138/130; 138/127; 138/135; 138/144
(58) Field of Search ................. 138/124, 125, 138/126, 127, 130, 135, 144

(56) References Cited

U.S. PATENT DOCUMENTS

| | | |
|---|---|---|
| 3,441,057 A | 4/1969 | Clement et al. |
| 3,585,540 A | 6/1971 | Schuttloffel et al. |
| 4,285,534 A | 8/1981 | Katayama et al. |
| 4,403,631 A | 9/1983 | Abdullaev et al. |
| 4,903,735 A | 2/1990 | Delacour et al. |
| 5,174,685 A | 12/1992 | Buchanan |
| 5,307,842 A | 5/1994 | Lequeux |
| 5,314,210 A | 5/1994 | Calmettes et al. |
| 5,667,008 A | 9/1997 | Moore |
| 5,676,175 A | 10/1997 | Bar et al. |
| 5,782,506 A | 7/1998 | Uematsu et al. |
| 5,890,960 A | 4/1999 | Cronan et al. |
| 5,918,641 A | 7/1999 | Hardy et al. |
| 5,921,285 A | 7/1999 | Quigley et al. |
| 5,934,332 A | 8/1999 | Rodriguez et al. |
| 6,004,639 A | 12/1999 | Quigley et al. |
| 6,016,845 A | 1/2000 | Quigley et al. |
| 6,039,083 A | 3/2000 | Loper |
| 6,053,213 A | 4/2000 | Jung et al. |
| 6,016,848 A | 6/2000 | Egres, Jr. |

OTHER PUBLICATIONS

International Searching Authority, Patent Cooperation Treaty, Notification of Transmittal of The International Search Report or the Declaration, International Application No. PCT/US00/30403, Apr. 2, 2001, 5 pages.

*Primary Examiner*—James Hook
(74) *Attorney, Agent, or Firm*—Haynes and Boone, LLP

(57) ABSTRACT

A flexible pipe and a method of manufacturing same according to which the pipe is formed by multiple layers of different materials and suitable for use in subsea and land-based applications.

19 Claims, 1 Drawing Sheet

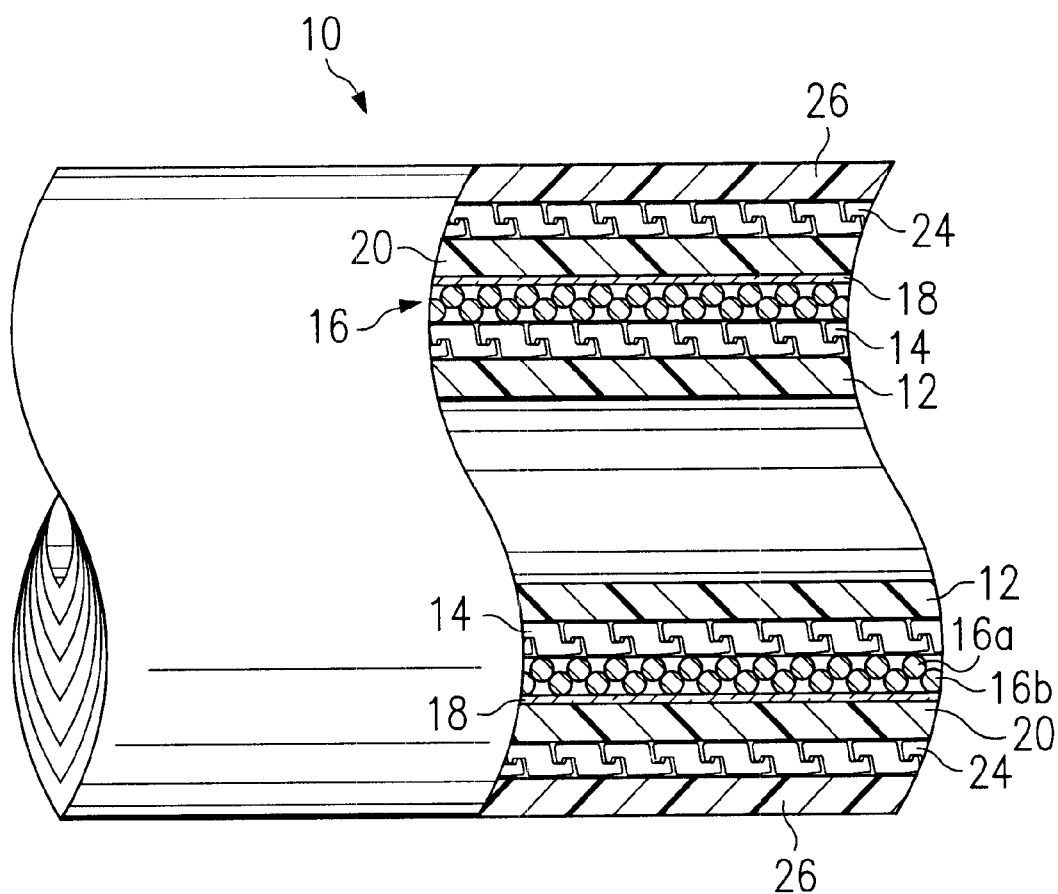

FLEXIBLE PIPE AND METHOD OF MANUFACTURING SAME

This application claims priority of provisional application Ser. No. 60/163,908 filed Nov. 5, 1999.

The present invention relates to a relative low-cost flexible pipe formed by multiple layers of different materials and suitable for use in subsea and land-based applications.

BRIEF DESCRIPTION OF THE DRAWING

The drawing is a partial longitudinal sectional view of a flexible pipe according to an embodiment of the present invention.

DETAILED DESCRIPTION

With reference to the drawing, a flexible pipe according to an embodiment of the present invention is shown, in general by the reference numeral 10. The pipe 10 is formed by an inner tubular member, preferably in the form of a plastic sheath 12 for conveying fluid through its bore. The sheath may be formed in a conventional manner using polymers, or the like.

A layer 14 is wrapped around the sheath 12 and provides resistance to internal pressure. The layer 14 is formed by helically wrapping a continuous metal strip, preferably formed of carbon steel, with adjacent windings being interlocked, to form a flexible layer that provides significant hoop and axial strength. The layer 14 is marketed by the assignee of the present invention, Wellstream, Inc., under the "Flexlok" trademark. Alternatively, the layer 14 can be of the types disclosed in application Ser. No. 60/163,908 filed concurrently herewith and assigned to the assignee of this application; with the disclosure of the former application being incorporated by reference.

A wrapped wire assembly 16 extends over the layer 14 and consists of a series of wires 16a helically wrapped around the exterior of the layer 14 to form a first tensile layer, and an additional series of wires 16b wrapped around the first series of wires 16a to form a second tensile layer extending over the first tensile layer. The wires 16a and 16b have a circular cross section, and are wound at a relatively high lay angle to provide significant hoop strength and axial strength. Preferably, at least a portion of the wires 16a and 16b are formed by carbon steel with a plastic or anodic coating. It is noted that the layer 14 prevents the expansion of the sheath 12 into gaps formed between the wires of the tensile layers 16a and 16b.

One or more layers of a tape 18 are helically wrapped over the wire assembly 16. The tape 18 can be formed by plastic or metal and can be reinforced with glass, metal or a different type of plastic. Although not shown in the drawings, it is understood that the tape 18 can also extend between the layer 14 and the wire assembly 16, and between the series of wires 16a and 16b.

A protective insulative sheath 20 extends over the tape 18 and can be formed of a foamed, or blown, polymer.

A layer 24 is wrapped around the sheath 20 and provides additional resistance to hydrostatic collapse and crush. The layer 24 is preferably formed by a plurality of helically wrapped, corrugated and/or interlocked strips to provide additional collapse and radial compression resistance as also disclosed in the above identified application.

An outer protective sheath 26 extends over the layer 24 and is preferably extruded over the layer 24 in a conventional manner.

It is understood that the thickness of the layer 24 and the structural strength of the sheath 20 can vary in accordance with the particular application. For example, if the flexible pipe 10 is used to convey fluids in relatively shallow water the layer 24 can be relatively thin and the sheath 20 can be designed to have some collapse resistance, thus providing a cost savings. On the other hand, if the flexible pipe 10 is used to convey fluids in relatively deep water the thickness of the layer 24 can be increased accordingly, and it would not be necessary to design the sheath 20 with any collapse resistance.

It is also understood that an additional layer identical to the wrapped wire assembly 16, or a tape, identical to the tape 18, can be provided in lieu of, or in additional to, the layer 24. Also, a tape, identical to the tape 18, can extend between the sheath 20 and the layer 24 and between the layer 24 and the sheath 26.

VARIATIONS

1. Additional tensile layers of wires can be provided in addition to the series of wires 16a and 16b in the pipe 10.
2. The relatively thicknesses of the sheath 12, layer 14, wire assembly 16, tape 18, sheath 20, layer 24, and sheath 26 are shown only for the purpose of example, it being understood that these thicknesses can be varied withing the scope of the invention.
3. The carbon steel strip 14 can be omitted which case the first tensile layer 16a would be wound directly onto the inner sheath 12.
3. If the carbon steel strip is omitted, as discussed in paragraph 2, above, an optional wrapped tape, similar to the tape 18 could be provided that extends between the inner sheath 12 and the first tensile layer 16a.
4. The adjacent windings of the strip forming the layers 14 and 24 do not have to be interlocked.
5. The cross section of the wires 16a and 16b can be rectangular as disclosed in the above cited application.
6. In extremely hostile environments, an outer layer similar to the layers 14 and 24 can be placed around the sheath 26 for added protection
7. The sheath 20 can be of a plastic that is extruded over the tape 18
8. The layer 24 can be identical to the layer 14 as described above.

It is understood that spatial references, such as "under", "over", "between", "outer", "inner" and "surrounding" are for the purpose of illustration only and do not limit the specific orientation or location of the layers described above.

Since other modifications, changes, and substitutions are intended in the foregoing disclosure, it is appropriate that the appended claims be construed broadly and in a manner consistent with the scope of the invention.

What is claimed is:

1. A flexible pipe, comprising:
   an inner tubular sheath defining a longitudinal passage;
   a plurality of wires wrapped around the inner tubular sheath to form a first tensile layer;
   a plurality of wires wrapped around the exterior of the first tensile layer to form a second tensile layer;
   an insulative sheath extending over the second tensile layer;
   a metal strip extending over the insulative sheath; and
   an outer sheath extending over the metal strip.
2. The pipe of claim 1 further comprising an additional metal strip extending over the inner tubular sheath and between the inner tubular sheath and the first tensile layer.

3. The pipe of claim 1 wherein the additional metal strip is helically wound over the inner tubular sheath.

4. The pipe of claim 1 wherein the metal strip is formed by a plurality of helically wrapped, corrugated and/or interlocked strips.

5. The pipe of claim 1 wherein the sheaths are formed of extruded plastic.

6. The pipe of claim 1 wherein the insulative sheath is formed by foamed or blown polymer.

7. The pipe of claim 1 further comprising at least one layer of tape extending between the second tensile layer and the insulative sheath.

8. The pipe of claim 1 wherein the wires are wrapped helically around the exterior of the tubular member.

9. The pipe of claim 8 wherein the wires of the second tensile layer are wrapped in an opposite direction to the wires of the first tensile layer.

10. The pipe of claim 1 further comprising an outer protective metal layer extending around the outer sheath.

11. A method of manufacturing a flexible pipe, the method comprising providing a tubular sheath defining a longitudinal passage; providing a plurality of wires around the tubular sheath; forming an insulative sheath over the wires; wrapping a metal strip over the insulative sheath; and providing an outer layer over the metal strip.

12. The method of claim 11 further comprising wrapping an additional metal strip over the tubular sheath, the wires being wrapped over the additional metal strip.

13. The method of claim 12 wherein the additional metal strip is helically wrapped over the inner tubular sheath.

14. The pipe of claim 11 further comprising forming the metal strip by a plurality of helically wrapped, corrugated and/or interlocked strips.

15. The method of claim 11 further comprising wrapping at least one layer of tape over the wires.

16. The method of claim 11 wherein the wires are helically wrapped around the metal strip in a manner to form a first tensile layer, and further comprising helically wrapping additional wires around the first-mentioned wires to form a second tensile layer extending over the first tensile layer.

17. The method of claim 16 wherein the wires forming the second tensile layer are wrapped helically in an opposite direction to the wires forming the first tensile layer.

18. The method of claim 11 wherein the outer layer is formed by extruding a plastic sheath over the metal strip.

19. The method of claim 11 further comprising providing an outer protective layer extending around the outer layer.

* * * * *